Oct. 16, 1962 C. B. STAIR 3,058,548
EMERGENCY TRAILER BRAKE ACTUATOR
Filed June 20, 1958 2 Sheets-Sheet 1
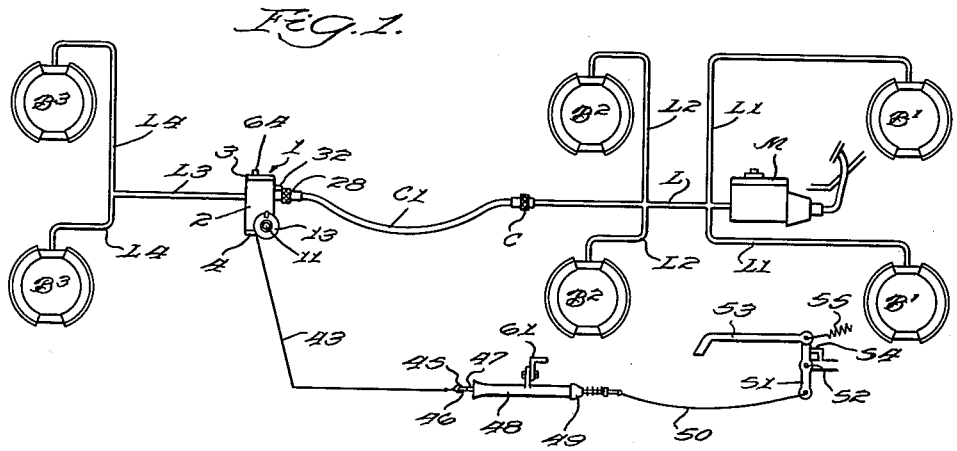
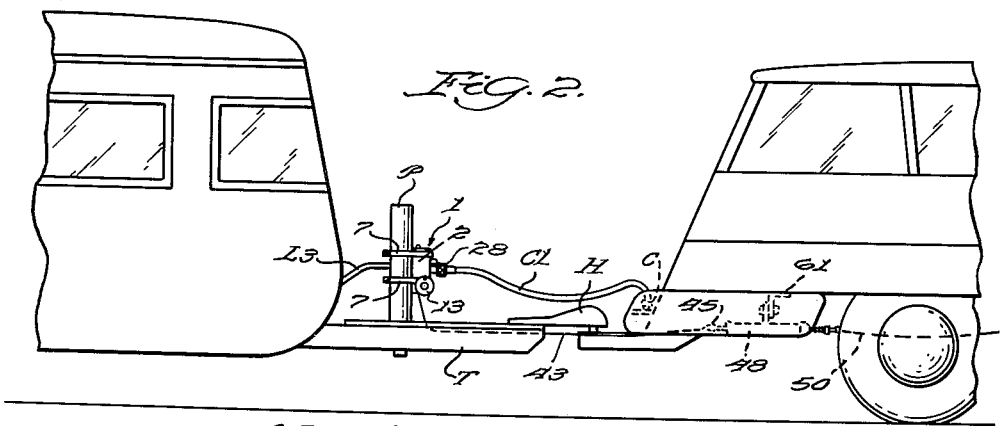
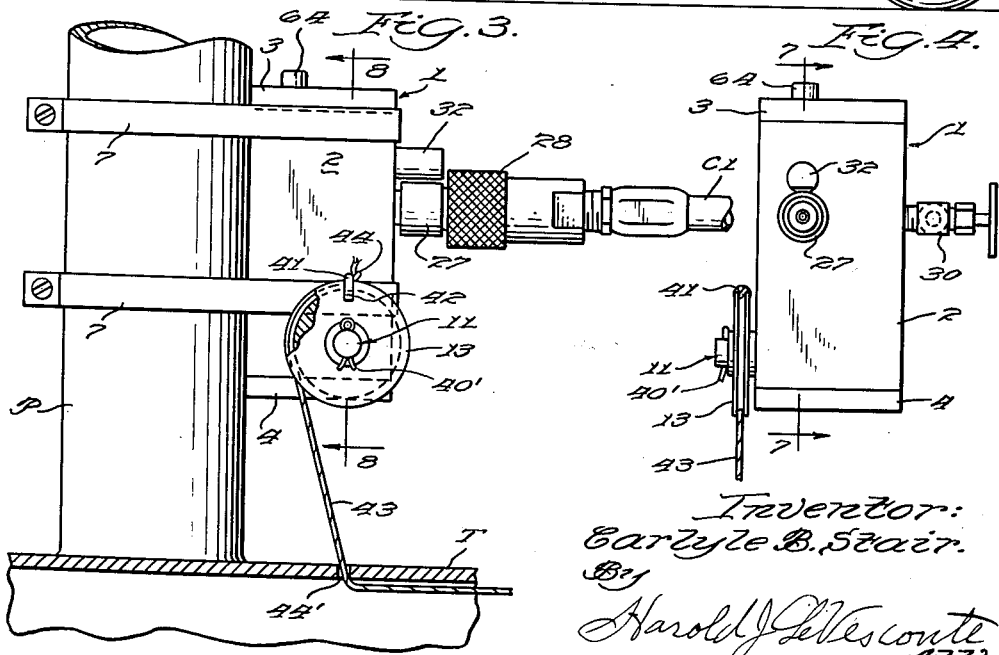
Inventor:
Carlyle B. Stair.
By
Harold J. LeVesconte
Atty.

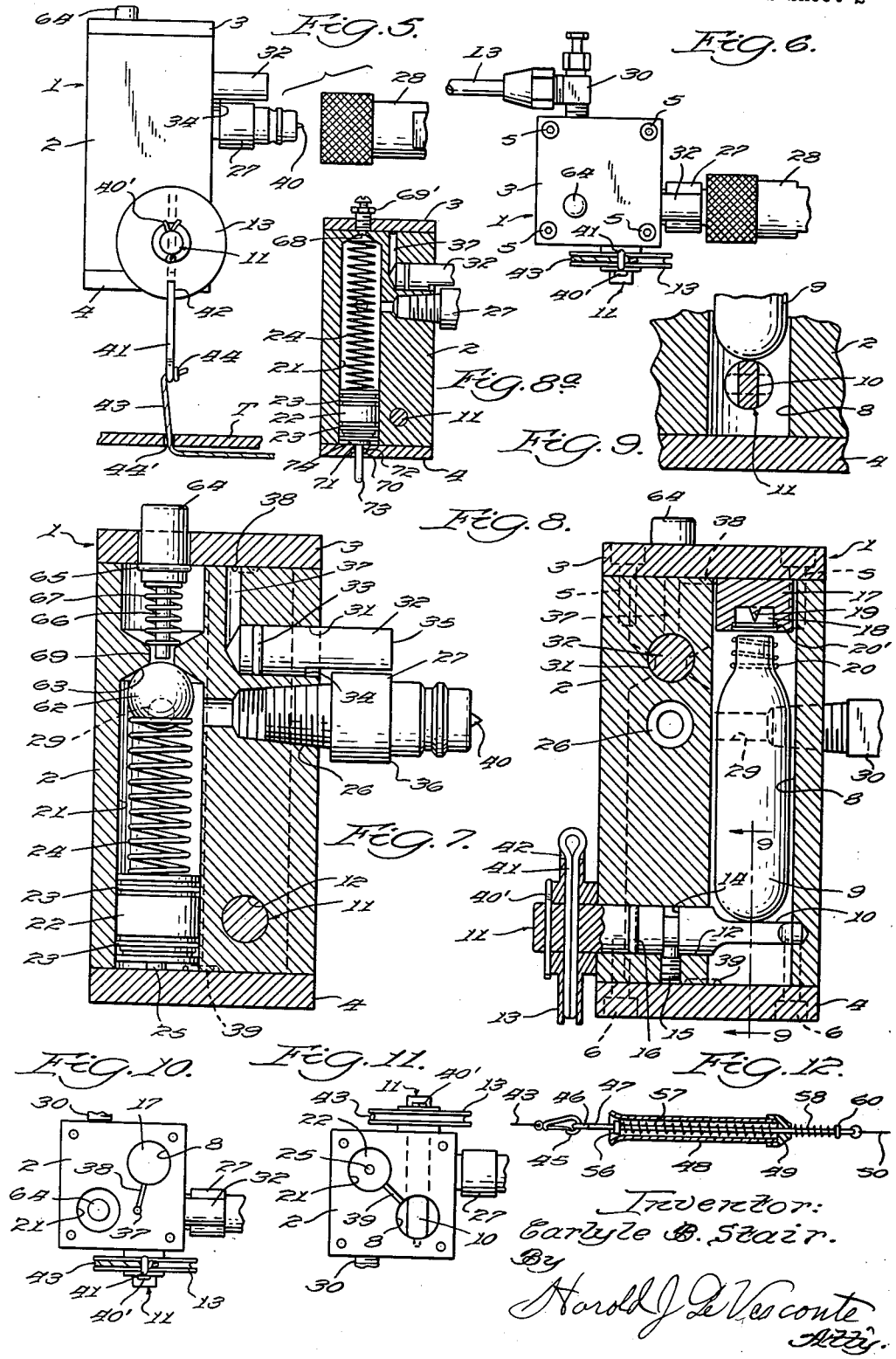

United States Patent Office

3,058,548
Patented Oct. 16, 1962

3,058,548
EMERGENCY TRAILER BRAKE ACTUATOR
Carlyle B. Stair, 3109 Buckingham Road, Glendale, Calif.
Filed June 20, 1958, Ser. No. 743,381
19 Claims. (Cl. 188—112)

This invention relates to hydraulic braking devices for trailers and constitutes an improvement over the trailer braking devices forming the subject matter of my prior application Serial No. 642,499 filed February 26, 1957, now Pat. No. 2,966,965.

An object of the invention is to provide hydraulically actuated braking devices for trailers which are adapted for connection to the hydraulic braking system of the towing vehicle for normal operation simultaneously with and by the service brake devices of the towing vehicle and including devices rendered operable by the driver of the towing vehicle, in the event of failure of the towing vehicle brakes, to actuate the trailer brakes with simultaneous shutting off of the flow of brake fluid from the trailer braking system so that the said trailer braking system then operates as a separate and independent unit.

Another object of the invention is to provide a hydraulically actuated braking device for trailers which is adapted for connection to the hydraulic braking system of the towing vehicle for normal operation simultaneously with and by the service brake devices of the towing vehicle together with devices rendered operable by breakaway separation of the trailer from the towing vehicle to disconnect the trailer braking system from the towing vehicle braking system, close the flow of fluid from the trailer braking system to or toward the towing vehicle's braking system and simultaneously and automatically apply an elastic force to the fluid in the trailer braking system with resultant application of the trailer brakes.

A further object of the invention is to provide a trailer brake and actuating means therefor which is adapted for connection to and operable by the hydraulic braking system of a towing vehicle and which includes a manually operable bleed valve means to permit the exhaustion of any entrapped air in the trailer braking system.

Still another object of the invention is to provide a trailer brake operating apparatus adapted for connection by a fluid conduit means to the hydraulically operated brakes of a trailer and including means for enclosing a compressed gas cartridge and devices extending therefrom to the towing vehicle effective to puncture the gas cartridge with resultant release of compressed gas to apply the pressure thereof against the fluid in the trailer brake system for brake application and simultaneously to operate other devices to disconnect the trailer brake system from the conduit means connecting it with the brake system of the towing vehicle without subjecting the said connecting conduit means to tension incident to separation therefrom.

With the foregoing objects in view, together with such additional objects and advantages as may subsequently appear, the invention resides in the parts, and in the construction, combination and arrangement of parts described, by way of example, in the following specification of certain presently preferred embodiments of the invention, reference being had to the accompanying drawings which form a part of said specification and in which drawings:

FIG. 1 is a schematic view of the connected brake systems of a towing vehicle and a trailer and including the trailer brake operating devices forming the present invention, FIG. 2 is a side elevation of the rear end of a towing vehicle and the front end of a house trailer connected together and showing the devices of the present invention as connected to the towing vehicle and mounted on the trailer, FIG. 3 is an enlarged side elevation of the trailer brake emergency actuating device shown mounted on the trailer tongue caster supporting post, FIG. 4 is a front elevation of the device shown in FIG. 3, the view being from the right hand side of FIG. 3, FIG. 5 is a view in side elevation similar to FIG. 3 except that the portion of the trailer to which the device is mounted is omitted and the device is shown in the position occupied by the parts when subjected to emergency actuation, FIG. 6 is a top plan view of the device as shown in FIGS. 3 and 4, FIG. 7 is an enlarged transverse sectional view of the device taken on the line 7—7 of FIG. 4, FIG. 8 is a transverse sectional view of the device taken on the line 8—8 of FIG. 3, FIG. 8a is a reduced scale sectional view similar to FIG. 8 but showing an alternative form of air bleeding means, FIG. 9 is a fragmentary view of the bottom portion of FIG. 8 taken on the line 9—9 and showing the position of the means for effecting rupture of the gas cartridge seal at the point of extreme penetration of the gas cartridge, FIG. 10 is a top plan view of the device with the top cover plate removed, FIG. 11 is a bottom plan view of the device with the bottom cover plate removed, and FIG. 12 is an enlarged longitudinal sectional view of the means for taking up the slack in the actuating member for the device.

Referring first to FIG. 1 of the drawings there is shown schematically the braking system of the towing vehicle comprising a pedal actuated master cylinder M having a manifold discharge line L from which lines L1, L1 lead to the brake mechanisms B1, B1 of the front wheels of the towing vehicle and from which lines L2, L2 lead to the brakes B2, B2 of the rear wheels. Additionally the line L is connected by a coupling C to a flexible conduit means C1 which at its other end is connected to the device constituting the present invention, said device being generally indicated by the numeral 1 and having a fluid conduit line L3 connected by branch lines L4, L4 to the trailer brakes B3, B3. Under normal operating conditions all of the brakes of the towing vehicle and of the trailer are responsive to the actuation of the master cylinder M by the foot pedal associated therewith. The present invention is directed to devices for emergency actuation of the trailer brakes either from the towing vehicle by the driver or by means automatically rendered operable in the event of breakaway separation of the trailer from the towing vehicle. Normally, the trailer is coupled to the towing vehicle by suitable hitch means H and the conduit means C1 is of such length as to be slightly slack when the trailer is normally coupled to the towing vehicle in order that it may not be subjected to tension. The means for disengaging this conduit without subjecting the conduit means to tension will be explained in connection with the detailed description of the device.

The device comprises a body member 2 having certain bores and fluid channels formed therein to be later explained in detail and having a removable top plate 3 and a removable bottom plate 4 attached thereto by screws 5 and 6, respectively; the joints between the cover plates and body being sufficiently tight to prevent the escape of gas or fluid. The device may be mounted on any suitable location at the front of the trailer a preferred position being on the post P rising from the trailer tongue T and on which post the tongue supporting caster is mounted when the trailer is detached from the towing vehicle. Any suitable means for securing the device to the caster post P may be employed, for example, band clamps 7, 7 may be employed.

The body 2 is provided with a bore 8 extending therethrough said bore being of a size adapted to receive a cartridge 9 of compressed gas such as carbon dioxide therein, the lower end of said cartridge being supported upon the flattened portion 10 of a shaft 11 journaled in a bore 12 the lower end of the body 2, said shaft extending to the exterior of one side of the body 2 and carrying a grooved pulley 13 and said flattened portion serving as a cam means for releasing the gas in the cartridge. The shaft 11 is provided with a first groove 14 which is engaged by a set screw 15 threaded into the body member 2 and effective to prevent endwise movement of the shaft while allowing free rotation thereof, said screw entering from the lower end of said body member and being enclosed by the cover plate 4. Between the groove 14 and the outer end of the shaft, the shaft is grooved and carries an O-ring 16 effective to prevent the loss of pressure when the cartridge 9 is ruptured. Beneath the upper cover plate 3 and loosely fitting the bore 8 is a plug 17, said plug at its lower end having a receiving socket 18 for the sealed end of the cartridge 9 and a piercing point 19 in said socket adapted to rupture the cartridge seal. When the shaft 11 is rotated to at least a quarter revolution by means presently to be described the movement of the flattened portion from a horizontal position as shown in dotted lines in FIG. 9 to the full line position shown therein forces the gas cartridge upward causing the sealed end thereof to be pierced by the piercing member 19 with resultant release of the gas compressed therein. When a cartridge has been expended and is to be replaced the upper cover plate 3 is removed, the compression spring 20 which at its lower end tightly surrounds the neck of the cartridge 9 and at its upper end snaps into a groove 20' in the recess 18, lifts the plug partially out of the bore 8 and thus provides a handle means to lift the cartridge out of the bore 8. The new cartridge is then inserted in the end of the spring before being lowered into the bore 8.

The body member 2 is further provided wtih a cylinder bore 21 extending upwardly from the lower end thereof to a point adjacent the upper end of the body member and terminating therein in a check valve means to be presently described. Slidably mounted in the bore 21 is a freely movable piston 22 which is provided with suitable gasket means 23, 23 at its upper and lower ends and which is normally urged toward the lower end of the bore 21 by a pre-stressed compression spring 24 engaging the upper end of the piston and reacting against the said check valve means at the upper end of the bore 21, the lower end of said piston having a reduced diameter foot portion 25 serving to keep the end face spaced away from the lower cover plate 4. Adjacent its upper end the bore 21 communicates with a threaded port 26 in which one member 27 of a detachable self sealing coupling combination is mounted, the other end 28 of said coupling being mounted on the distal end of the flexible conduit C1, said port and coupling being located on the front face of the body member 1, that being the face facing the towing vehicle. The said upper end of the bore 21 is further provided with a second port 29 which communicates with an angle valve 30 connecting it to the line L3 serving the trailer brakes.

The body member 2 is further provided with a laterally extending bore 31 disposed parallel to and closely adjacent above the port 26 in which a piston element 32 carrying an O-ring seal 33 is reciprocable, said piston element being cut away to afford clearance for the fitting 27, the rear end of said clearance forming a shoulder 34 engageable with the end of the fitting 27 to prevent the escape of the piston element from the bore 31. When the piston element 32 is retracted in the bore 31 the outer end 35 thereof is substantially flush with the outer end of the outer body member 36 of the fitting 27 and is below the adjacent end of the fitting 28 as best shown in FIG. 3. The inner end of the bore 31 is connected by an upwardly extending passage 37 with a groove 38 formed in the upper face of the body 2 and extending from the channel 37 to the bore 8. The lower end of the body 2 is likewise provided with a groove 39 extending between the bore 8 and the bore 21 below the lower end of the piston 22. The detachable coupling comprising the members 27 and 28 is self-sealing at each end, the self-sealing valve of the portion 27 of the said coupling being shown at 40 in FIG. 7.

When the gas cartridge 9 is ruptured by rotation of the shaft 11 as previously explained, a portion of the pressure will extend through the groove 38 and channel 37 to the inner end of the bore 31 and operate on the piston member 32 causing it to move outwardly, engage the portion 28 of the coupling and force it off of the member 27 as best shown in FIG. 5. It is particularly to be noted that in so doing the flexible conduit C1 is not subjected to tension. Simultaneously, the released pressure engages the underside of the piston 22 and causes it to move upwardly compressing the brake fluid therein and, since the escape of brake fluid through the fitting 27 is prevented by the self-sealing valve 40, the pressure thus applied extends through the port 29, valve 30 and lines L3 and L4 to the trailer brakes B3 causing the brakes to be applied.

The actuating pulley 13 is secured against removal from the shaft 11 by a cotter pin 40' extending through the shaft adjacent the outer face of the pulley hub. The pulley is secured against relative rotation on the shaft by a second cotter pin 41 which extends diametrically of the pulley through the cable receiving groove in the pulley and through the shaft, the bifurcated end of the cotter pin being straight, the rim of the pulley in which the looped end of the cotter pin is located being slotted to allow the said looped end to come down into the pulley groove as shown at 42 in FIGS. 3 and 8, and it will be noted that the holes for the cotter pins 40' and 41 in the shaft 11 are arranged parallel to each other and at right angles to the flattened portion 10 of the shaft so that when these holes are disposed vertically the flattened portion 10 is disposed horizontally.

A cable 43 has one end thereof extending through the eye of the cotter pin 41 and is secured against removal therefrom by a knot 44 or other suitable obstructing means and the cable thence extends around the pulley groove in a counter-clockwise direction as viewed for example in FIG. 3 thence through a hole 44' in the trailer tongue and thence laterally toward and beyond the free end of the trailer tongue and terminates in a snap hook 45 engaging the looped end 46 of a rod 47 which is slidable in a tubular housing 48 and extends through a guide 49 in the opposite end of the housing and thence attached by a second cable 50 to a manually operating means on or near the dashboard of the towing vehicle here shown as a lever 51 pivoted at 52 and operable by a pull handle 53 at the opposite side of the pivot or fulcrum 52, the support for the pivot 52 including a stop means 54 and the lever being normally biased against the stop by a spring 55. The rod 47 adjacent the looped end 46 carries a collar 56 surrounding the rod 46 and extending between the collar 56 and the inner face of the guide 49 is a compression spring 57 which normally is not under any initial tension. The rod 46 exteriorly of the guide 49 also carries a light compression spring 58 extending between the outer end of the guide 49 and a collar 60 adjacent the end of the rod to which the cable 50 is attached. The tubular guide 48 is provided with suitable means such as the bracket 61 by which it is attached to the underside of a towing vehicle at a convenient point forwardly of the rear end of the vehicle body. The brake line L extends rearwardly to a point separately of the towing vehicle and terminates in the connection C for the flexible conduit means C1 just forward of the rear bumper preferably so that the flexible conduit C1 may extend over the upper edge of the bumper and thence rearwardly to its connection with the device of the present invention.

Assuming that the towing vehicle and trailer have been coupled together and are on the road and that the towing vehicle brakes fail for any reason, the driver grasps the lever 46 and pulls on it thereby effecting a pull through the cable 50, rod 47 and cable 43 to the pulley 13. This will cause the pulley to be rotated in a counterclockwise direction for approximately a one half revolution at which point the cotter pin 41 will be pulled free as shown in FIG. 5. Incident to the rotation of the pulley and shaft the flattened portion 10 will have been moved through the same one half revolution at the high point of which, as shown in FIG. 9, the gas cartridge will have been moved upwardly into engagement with the piercing point 19 and the compressed gas released. A portion of this gas will flow through the channel 38 causing the piston element 32 to disconnect the conduit coupling elements 27 and 28 with resultant disconnection of the flexible conduit C1 from the device.

Another portion of the compressed gas will pass through the channel 39 to the underside of the piston 22 and apply fluid pressure to the trailer brakes, it being noted as previously pointed out that the detachable connection for the flexible conduit C1 includes the self-closing valve 40 to prevent escape of fluid therefrom. In this connection it should be noted also that the effect of the spring 58 is to maintain a very light tension on the cord 43 through movement of the rod 47 to the right as viewed in FIG. 12 to the extent permitted by the full extension of the stronger spring 57, this producing a slight amount of slack in the cable 50. This slack permits angular movement of the two vehicles without danger that such relative movement will cause accidental actuation of the device.

In the event of a breakaway separation of the trailer from the towing vehicle, the separation of the vehicles will cause the cable 43 to place tension on the rod 47 and pull it until the lighter spring 58 is completely collapsed and the collar 60 prevents further movement. This will, of course, cause the pulley 13 and shaft 11 to be rotated as before with a resultant application of the trailer brakes by the released pressure of the gas cartridge and the said separation of the vehicles thereafter rupturing the cable 43 after having pulled the cotter pin 41 out of the shaft and pulley and bringing it into engagement with the hole 44 in the trailer tongue. Incident to replacing a gas cartridge, the cotter pin 41 may be inserted through the pulley and shaft as an incident to thus positioning the shaft or it may be done after the cartridge is replaced. The vertical position of the cotter pin 40' will serve as an indicator that the flattened portion is in the proper position. The recoupling of the flexible conduit C1 to the coupling member 27 can then be effected but these quick disconnect couplings cannot avoid the inclusion of a small amount of air in the line which must then be expelled. This air will be conducted through the port 26 into the cylinder bore 21 and it will be noted in FIG. 8 that the spring 24 which normally holds the piston seated against the lower end of the cylinder reacts against a check ball 62 seated in the conical seat 63 in the upper end wall of the cylinder. Mounted in the top cover plate 3 is a push button 64 having a sealing ring 65 seated in a peripheral groove therein and engaging the inner face of the cover 3, said button carrying a downwardly extending pin 66 which is held just out of engagement with the check ball 62 by a compression spring 67 reacting between the lower end of the push button 64 and the lower face of a cylindrical recess 68 coaxially aligned with the cylinder bore 21 and terminating in a connecting passageway 69 therebetween, the spring 67 serving to hold the sealing gasket 65 normally in tight engagement with the underface of the cover member 3. After the conduit C1 has been reconnected to the device, the button 64 is momentarily depressed and any entrapped air will pass through between the ball 62 and the seat therefor 63 thence into the cavity in which the spring 67 is contained and thence past the seal 65 and through the hole in the cover member 3 through which the button 64 extends. This cavity is always full of fluid which on depressing the button will flow into the cylinder 21 to the extent required to effect the dispacement of any entrapped air. Release of the button 64 serves to permit the spring 24 and ball 62 to seal the contained fluid in this cavity. The result is that the connection of the two braking systems can be readily effected and any entrapped air removed therefrom so that the "spongy" condition of the brakes that would otherwise result is prevented.

Referring to FIG. 8a there is shown an alternative air bleeding means in which the cylinder 21 terminates in a reduced diameter passage 68 which communicates with a bleed valve means 69' threaded into the top cover 3. The bottom cover 4, below the piston 22, is provided with a bore 70 having an annular groove 71 seating an O-ring 72 and through which bore the shank of a plunger 73 extends, said plunger having a head 74 resting on the inner face of the bottom cover 4 beneath the piston 22. When the cylinder 21 is to be bled of entrapped air, the valve 69 is opened and the plunger 73 moved upwardly lifting the piston 22 until fluid flows out of the bleed valve. Then while holding the plunger thus elevated the valve is closed. The downward movement of the piston by the spring 24 will draw fluid from the master cylinder supply.

Thus it is that there has been provided a trailer brake emergency actuating device which normally allows the trailer brakes to be actuated simultaneously with and by the usual application of the service brake pedal of the towing vehicle and which in the event of the failure of the towing vehicle brakes can be actuated by the driver of the vehicle to cause the trailer brakes to be applied and to bring the towing vehicle to a stop and which further, in the event of breakaway separation between the trailer and towing vehicle will also automatically apply the trailer brakes to prevent the runaway of the released trailer. The valve 30 is a further convenience in that when the trailer is to be parked and the towing vehicle disconnected therefrom before such disconnection is made the trailer and towing vehicle brakes can be set by application of the service brake pedal and while being held in that position the valve 30 can be closed thus shutting off the fluid in the trailer brake system with the brakes thereof being applied. When the trailer is again to be moved by the towing vehicle the fact that the brakes are thus set would be indicated by the failure of the trailer readily to move which will thus show that the valve 30 must be opened.

While in the foregoing specification, there has been disclosed, by way of example, a presently preferred embodiment of the invention, it is not to be inferred therefrom that the invention is limited to the exact details thus disclosed and it will be understood that the invention includes as well all such changes and modifications in the parts and in the construction, combination and arrangement of parts as shall come within the purview of the appended claims.

I claim:

1. An emergency actuator for hydraulic brakes on trailers adapted to be mounted on the trailer and interposed in a fluid conduit means extending from the braking system of the towing vehicle to the trailer brakes for normal simultaneous actuation of all brakes by the foot pedal and master cylinder of the towing vehicle; said emergency actuator comprising a body member having a first port carrying one self-sealing component of a quick-disconnect, self-sealing coupling means engageable with the other self-sealing component thereof carried by a flexible conduit extending from the towing vehicle braking system and a second port connected by fluid conduit means to the trailer brake cylinder, means interconnecting said ports within said body, a cartridge containing unreleased, compressed gas housed within said body, means carried by said body operative to effect the release of the gas in said cartridge, means for retaining the released gas within said body, and devices carried by said body and actuated by the pressure of the released gas operative to engage said other of said coupling components and disconnect it from said one coupling component without the imposition of tension on the flexible conduit means.

2. An emergency actuator for hydraulic brakes on trailers adapted to be mounted on the trailer and interposed in a fluid conduit means extending from the braking system of the towing vehicle to the trailer brakes for normal simultaneous actuation of all brakes by the foot pedal and master cylinder of the towing vehicle; said emergency actuator comprising a body member having a first port carrying one self-sealing component of a quick-disconnect, self-sealing coupling means engageable with the other self-sealing component thereof carried by a flexible conduit extending from the towing vehicle braking system and a second port connected by fluid conduit means to the trailer brake cylinder, means interconnecting said ports within said body, a cartridge containing unreleased, compressed gas housed within said body, means carried by said body operative to effect the release of the gas in said cartridge, means for retaining the released gas within said body, devices carried by said body and actuated by the pressure of the released gas operative to engage said other of said coupling components and disconnect it from said one coupling component without the imposition of tension on the flexible conduit means, and other devices carried by said body and actuated by the pressure of released gas effective simultaneously to impose the pressure of the released gas on the fluid in the trailer braking system and resultant energization of the trailer brakes.

3. An emergency actuator for hydraulic brakes on trailers adapted to be mounted on the trailer and interposed in a fluid conduit means extending from the braking system of the towing vehicle to the trailer brakes for normal simultaneous actuation of all brakes by the foot pedal and master cylinder of the towing vehicle; said emergency actuator comprising a body member having a first port carrying one self-sealing component of a quick-disconnect, self-sealing coupling means engageable with the other self-sealing component thereof carried by a flexible conduit extending from the towing vehicle braking system and a second port connected by fluid conduit means to the trailer brake cylinder, means interconnecting said ports within said body, a cartridge containing unreleased, compressed gas housed within said body, means carried by said body operative to effect the release of the gas in said cartridge, means for retaining released gas within said body, and devices carried by said body and actuated by the pressure of the released gas operative to engage said other of said coupling components and disconnect it from said one of said coupling components without the imposition of tension on the flexible conduit means; said devices including a piston element having one end mounted in a cylinder in said body and the other end thereof disposed exteriorly of said body and adjacent the end of said other component of said coupling means which is adjacent to said body, and a passage in said body effective upon release of gas from said cartridge to conduct released gas to said cylinder with resultant actuation of said piston to effect disengagement of said other of said coupling components from said one component.

4. An emergency actuator for hydraulic brakes on trailers adapted to be mounted on the trailer and interposed in a fluid conduit means extending from the braking system of the towing vehicle to the trailer brakes for normal simultaneous actuation of all brakes by the foot pedal and master cylinder of the towing vehicle; said emergency actuator comprising a body member having a first port carrying one self-sealing component of a quick-disconnect, self-sealing coupling means engageable with the other self-sealing component thereof carried by a flexible conduit extending from the towing vehicle braking system and a second port connected by fluid conduit means to the trailer brake cylinder, means interconnecting said ports within said body, a cartridge containing unreleased, compressed gas housed within said body, means carried by said body operative to effect the release of the gas in said cartridge, means for retaining the released gas within said body, devices carried by said body and actuated by the pressure of the released gas operative to engage said other of said coupling components and disconnect it from said one coupling component without the imposition of tension on the flexible conduit means, and other devices carried by said body and actuated by the pressure of released gas effective simultaneously to impose the pressure of the released gas on the fluid in the trailer braking system with resultant energization of the trailer brakes; said other devices including a cylinder in said body having communication with both of said ports, a piston wholly contained within said cylinder, a spring normally moving said piston away from said ports whereby said cylinder serves as the connecting means between said ports, and a passage effective to conduct gas released from said cartridge to the end of said piston opposite the end facing said ports and thereby effective to cause said piston to impose the pressure of the released gas on the fluid in said cylinder with resultant energization of the trailer brakes.

5. An emergency actuator for hydraulic brakes on trailers adapted to be mounted on the trailer and interposed in a fluid conduit means extending from the braking system of the towing vehicle to the trailer brakes for normal simultaneous actuation of all brakes by the foot pedal and master cylinder of the towing vehicle; said emergency actuator comprising a body member having a first port carrying one self-sealing component of a quick-disconnect, self-sealing coupling means engageable with the other self-sealing component thereof carried by a flexible conduit extending from the towing vehicle braking system and a second port connected by fluid conduit means to the trailer brake cylinder, means interconnecting said ports within said body, a cartridge containing unreleased compressed gas housed within said body, means carried by said body operative to effect the release of the gas in said cartridge, means for retaining the released gas within said body, devices carried by said body and actuated by the pressure of the released gas operative to said other of said coupling components and disconnect it from said one coupling component without the imposition of tension on the flexible conduit means; other devices responsive to the pressure of released gas effective to actuate the trailer brakes, said coupling disconnecting devices including a piston element having one end mounted in a cylinder in said body and the other end thereof disposed exteriorly of said body adjacent the end of said other component of said coupling means which is adjacent to said body, and a passage effective to conduct released gas to said piston with resultant actuation of said piston to effect separation of said coupling components upon release of the gas in said cartridge, said other devices including a cylinder in said body having communication with both of said ports, a piston wholly contained within said cylinder, a spring normally moving said piston away from said ports whereby said cylinder serves as the connecting means between said ports, and a passage effective to conduct gas released from said cartridge to the end of said piston opposite the end facing said ports and thereby effective to cause said piston to impose the pressure of the released gas on the fluid in said cylinder with resultant energization of the trailer brakes.

6. An emergency actuator for hydraulic brakes on trailers adapted to be mounted on the trailer and interposed in a fluid conduit means extending from the braking system of the towing vehicle to the trailer brakes for normal simultaneous actuation of all brakes by the foot pedal and master cylinder of the towing vehicle; said emergency actuator comprising a body member having a first port carrying one self-sealing component of a quick-disconnect, self-sealing coupling means engageable with the other component thereof carried by a flexible conduit extending from the towing vehicle braking system and a second port interconnected within said body with said first port and externally of said body with fluid conduit means leading to the trailer brakes, a normally sealed cavity in said body member adapted to house a sealed cartridge of compressed gas, removable cover means carried by said body affording access to said cavity, a cartridge seal piercing member in said cavity disposed in proximity to the cartridge seal, yielding means normally preventing contact between said piercing member and said cartridge seal, cam means carried by said body and operable from the exterior of said body to cause relative movement between said cartridge and said piercing member in opposition to said yielding means with resultant piercing of the cartridge seal and release of the gas therefrom, means for retaining the released gas within said body, and devices actuated by the pressure of the released gas operative to force said other coupling component out of engagement with said one coupling component without the imposition of tension on said flexible conduit.

7. An emergency actuator for hydraulic brakes on trailers adapted to be mounted on the trailer and interposed in a fluid conduit means extending from the braking system of the towing vehicle to the trailer brakes for normal simultaneous actuation of all brakes by the foot pedal and master cylinder of the towing vehicle; said emergency actuator comprising a body member having a first port carrying one self-sealing component of a quick-disconnect, self-sealing coupling means engageable with the other component thereof carried by a flexible conduit extending from the towing vehicle braking system and a second port interconnected within said body with said first port and externally of said body with fluid conduit means leading to the trailer brakes, a normally sealed cavity in said body member adapted to house a sealed cartridge of compressed gas, removable cover means carried by said body affording access to said cavity, a cartridge seal piercing member in said cavity disposed in proximity to the cartridge seal, yielding means normally preventing contact between said piercing member and said cartridge seal, cam means carried by said body, actuating means for said cam means operable from the exterior of said body as an incident to unintended separation of the trailer and towing vehicle effective to cause relative movement between said cartridge and said piercing member in opposition to said yielding means with resultant piercing of the cartridge seal and release of the gas therefrom into said cavity, means for retaining the released gas within said body, and devices carried by said body and actuated by the pressure of the released gas operative to impose the pressure of the released gas on the fluid in the trailer braking system with resultant energization of the trailer brakes.

8. An emergency actuator for hydraulic brakes on trailers adapted to be mounted on the trailer and interposed in a fluid conduit means extending from the braking system of the towing vehicle to the trailer brakes for normal simultaneous actuation of all brakes by the foot pedal and master cylinder of the towing vehicle; said emergency actuator comprising a body member having a first port carrying one self-sealing component of a quick-disconnect, self-sealing coupling means engageable with the other component thereof carried by a flexible conduit extending from the towing vehicle braking system and a second port interconnected within said body with said first port and externally of said body with fluid conduit means leading to the trailer brakes, a normally sealed cavity in said body member adapted to house a sealed cartridge of compressed gas, removable cover means carried by said body affording access to said cavity, a cartridge seal piercing member in said cavity disposed in proximity to the cartridge seal, yielding means normally preventing contact between said piercing member and said cartridge seal, cam means carried by said body and operable from the exterior of said body to cause relative movement between said cartridge and said piercing member in opposition to said yielding means with resultant piercing of the cartridge seal and release of the gas therefrom into said cavity, devices actuated by the pressure of the released gas operative to force said other coupling component out of engagement with said one coupling component without the imposition of tension on said flexible conduit, and other devices carried by said body and actuated by the pressure of the released gas operative to impose the pressure of the released gas on the fluid in the trailer braking system with resultant energization of the trailer brakes.

9. An emergency actuator for hydraulic brakes on trailers adapted to be mounted on the trailer and interposed in a fluid conduit means extending from the braking system of the towing vehicle to the trailer brakes for normal simultaneous actuation of all brakes by the foot pedal and master cylinder of the towing vehicle; said emergency actuator comprising a body member having a first port carrying one self-sealing component of a quick-disconnect, self-sealing coupling means engageable with the other self-sealing component thereof carried by a flexible conduit extending from the towing vehicle braking system and a second port connected by fluid conduit means to the trailer brake cylinder, means interconnecting said ports within said body, a cartridge containing unreleased compressed gas housed within said body, means operable from the exterior of said body operative to effect the release of the gas in said cartridge, means for retaining the released gas within said body, devices carried by said body and actuated by the pressure of the released gas operative to separate said coupling components without the imposition of tension on the flexible conduit means, and other devices carried by said body simultaneously actuated by the pressure of the released gas operative to impose that pressure on the fluid in the trailer braking system with resultant energization of the trailer brakes; said other devices including a cylinder in said body having communication with both of said ports and being filled with the braking system fluid, a piston in said cylinder, a spring normally moving said piston away from said ports whereby said cylinder serves as the connecting means between said ports, a passage effective to conduct gas released from said cartridge to the end of said piston opposite the end facing said ports and thereby effective to cause said piston to impose the pressure of the released gas on the fluid in said cylinder with resultant energization of the trailer brakes, and a manually operable bleed valve means carried by said body member operable to bleed off air entrapped in the trailer brake system.

10. An emergency actuator for hydraulic brakes on trailers adapted to be mounted on the trailer and interposed in a fluid conduit means extending from the braking system of the towing vehicle to the trailer brakes for normal simultaneous actuation of all brakes by the foot pedal and master cylinder of the towing vehicle; said emergency actuator comprising a body member having a first port carrying one self-sealing component of a quick-disconnect, self-sealing coupling means engageable with the other self-sealing component thereof carried by a flexible conduit extending from the towing vehicle braking system and a second port connected by fluid conduit means to the trailer brake cylinder, means interconnecting said ports within said body, a cartridge containing unreleased, compressed gas housed within said body, means carried by said body and operable from the exterior of said body for effecting the release of the gas in said cartridge, means for retaining the released gas within said body and including connecting means extending between said gas pressure releasing means and a manually operable handle means disposed within reach of the driver of the towing vehicle, and devices carried by said body and actuated by the pressure of the released gas effective to separate said coupling components without the imposition of tension on the flexible conduit means.

11. An emergency actuator for hydraulic brakes on trailers adapted to be mounted on the trailer and interposed in a fluid conduit means extending from the braking system of the towing vehicle to the trailer brakes for normal simultaneous actuation of all brakes by the foot pedal and master cylinder of the towing vehicle; said emergency actuator comprising a body member having a first port carrying one self-sealing component of a quick-disconnect, self-sealing coupling means engageable with the other self-sealing component thereof carried by a flexible conduit extending from the towing vehicle braking system and a second port connected by fluid conduit means to the trailer brake cylinder, means interconnecting said ports within said body, a cartridge containing unreleased, compressed gas housed within said body, means operable from the exterior of said body for effecting the release of the gas in said cartridge, means for retaining the released gas within said body, devices carried by said body and actuated by the pressure of the released gas operative to separate said coupling components without the imposition of tension on the flexible conduit means, and other devices carried by said body simultaneously actuated by the pressure of released gas operative to impose the pressure of the released gas on the fluid in the trailer braking system with resultant energization of the trailer brakes.

12. An emergency actuator for hydraulic brakes on trailers adapted to be mounted on the trailer and interposed in a fluid conduit means extending from the braking system of the towing vehicle to the trailer brakes for normal simultaneous actuation of all brakes by the foot pedal and master cylinder of the towing vehicle; said emergency actuator comprising a body member having a first port carrying one self-sealing component of a quick-disconnect, self-sealing coupling means engageable with the other self-sealing component thereof carried by a flexible conduit extending from the towing vehicle braking system and a second port connected by fluid conduit means to the trailer brake cylinder, means interconnecting said ports within said body, a cartridge containing unreleased, compressed gas housed within said body, means operable from the exterior of said body for effecting the release of the gas in said cartridge, means for retaining the released gas within said body, and devices carried by said body and actuated by the pressure of the released gas operative to separate said coupling components without the imposition of tension on the flexible conduit means; said pressure releasing means including connecting devices having one end thereof attached to a manually operable handle means in the towing vehicle within reach of the driver and the other end connected to said pressure releasing means by means effective upon tension on said connecting devices through operation of said handle means to effect the release of gas from said cartridge and then to permit the disengagement of said other end from said connecting devices.

13. An emergency actuator for hydraulic brakes on trailers adapted to be mounted on the trailer and interposed in a fluid conduit means extending from the braking system of the towing vehicle to the trailer brakes for normal simultaneous actuation of all brakes by the foot pedal and master cylinder of the towing vehicle; said emergency actuator comprising a body member having a first port carrying one self-sealing component of a quick-disconnect, self-sealing coupling means engageable with the other self-sealing component thereof carried by a flexible conduit extending from the towing vehicle braking system and a second port connected by fluid conduit means to the trailer brake cylinder, means interconnecting said ports within said body, a cartridge containing unreleased, compressed gas housed within said body, means carried by said body for effecting the release of the gas in said cartridge means for retaining the released gas within said body, devices carried by said body and actuated by the pressure of the released gas operative to separate said coupling components without the imposition of tension on the flexible conduit means; said pressure releasing means including connecting devices having one end attached to a manually operable handle means in the towing vehicle within reach of the driver and the other end connected to said devices by means effective upon tension on said connecting devices by operation of said handle means to effect the release of gas from said cartridge and then to permit the disengagement of said other end from said devices, and other devices carried by said body simultaneously actuated by the pressure of released gas operative to impose the pressure of the released gas on the fluid in the trailer braking system with resultant energization of the trailer brakes.

14. An emergency actuator for hydraulic brakes on trailers adapted to be mounted on the trailer and interposed in a fluid conduit means extending from the braking system of the towing vehicle to the trailer brakes for normal simultaneous actuation of all brakes by the foot pedal and master cylinder of the towing vehicle; said emergency actuator comprising a body member having a first port carrying one self-sealing component of a quick-disconnect, self-sealing coupling means engageable with the other component thereof carried by a flexible conduit extending from the towing vehicle braking system and a second port interconnected within said body with said first port and externally of said body with fluid conduit means leading to the trailer brakes, a normally sealed cavity in said body member adapted to house a sealed cartridge of compressed gas, removable cover means carried by said body affording access to said cavity, a cartridge seal piercing member in said cavity disposed in proximity to the cartridge seal, yielding means normally preventing contact between said piercing member and said cartridge seal, cam means carried by said body and operable from the exterior of said body to cause relative movement between said cartridge and said piercing member in opposition to said yielding means with resultant piercing of the cartridge seal and release of the gas therefrom, means for retaining the released gas within said body, devices actuated by the pressure of the released gas operative to force said other coupling component out of engagement with said one coupling component without imposition of tension on said flexible conduit, and actuating devices for said cam means comprising connecting devices having one end thereof attached to an operating handle in the towing vehicle and readily accessible to the driver thereof and the other end operatively connected to said cam means by means effective upon the application of tension to said connecting devices to cause said cam means to effect the release of gas from said cartridge and thereafter permit the disconnection of said flexible member from said cam means.

15. An emergency actuator for hydraulic brakes on trailers adapted to be mounted on the trailer and interposed in a fluid conduit means extending from the braking system of the towing vehicle to the trailer brakes for normal simultaneous actuation of all brakes by the foot pedal and master cylinder of the towing vehicle; said emergency actuator comprising a body member having a first port carrying one self-sealing component of a quick-disconnect, self-sealing coupling means engageable with the other self-sealing component thereof carried by a flexible conduit extending from the towing vehicle braking system and a second port connected by fluid conduit means to the trailer brake cylinder, means interconnecting said ports within said body, a cartridge containing unreleased, compressed gas housed within said body, means carried by said body for effecting the release of the gas in said cartridge, means for retaining the released gas within said body, devices carried by said body and actuated by the pressure of the released gas operative to impose the pressure of the released gas on the fluid of the trailer braking system with resultant energization of the trailer brakes; said means for releasing the gas in said cartridge comprising connecting devices having one end attached to an operating handle means disposed in the towing vehicle and readily accessible to the driver thereof and the other end attached to said means by devices effective upon application of tension on said connecting devices to cause said means to effect the release of gas from the cartridge and thereafter to permit the disconnection of said flexible member from said gas release effecting means.

16. An emergency actuator for hydraulic brakes on trailers adapted to be mounted on the trailer and interposed in a fluid conduit means extending from the braking system of the towing vehicle to the trailer brakes for normal simultaneous actuation of all brakes by the foot pedal and master cylinder of the towing vehicle; said emergency actuator comprising a body member having a first port carrying one self-sealing component of a quick-disconnect, self-sealing coupling means engageable with the other self-sealing component thereof carried by a flexible conduit extending from the towing vehicle braking system and a second port connected by fluid conduit means to the trailer brake cylinder, means interconnecting said ports within said body, a cartridge containing unreleased, compressed gas housed within said body, means for effecting the release of the gas from said cartridge, means for retaining the released gas within said body, and devices carried by said body and actuated by the pressure of the released gas operative to disconnect said coupling components without the imposition of tension on the flexible conduit means and including connecting devices extending from said devices to a manually operable handle means disposed in the towing vehicle and within the reach of the driver of the towing vehicle; said connecting devices being rupturable in the event of breakaway separation of the trailer from the towing vehicle and being of sufficient tensile strength so that prior to rupture, the tension thereon will actuate said gas releasing means with said disconnection of the fluid conduit means connecting the vehicles.

17. An emergency actuator for hydraulic brakes on trailers adapted to be mounted on the trailer and interposed in a fluid conduit means extending from the braking system of the towing vehicle to the trailer brakes for normal simultaneous actuation of all brakes by the foot pedal and master cylinder of the towing vehicle; said emergency actuator comprising a body member having a first port carrying one self-sealing component of a quick-disconnect, self-sealing coupling means engageable with the other self-sealing component thereof carried by a flexible conduit extending from the towing vehicle braking system and a second port connected by fluid conduit means to the trailer brake cylinder, means interconnecting said ports within said body, a cartridge containing unreleased, compressed gas housed within said body, devices extending between and connected to the towing vehicle and said body and including a flexible member separately operable either intentionally or automatically as an incident to unintended separation of the vehicles to effect the release of the gas in said cartridge carried by said body, means for retaining the released gas within said body, devices carried by said body and actuated by the pressure of the released gas effective to disconnect said coupling components without the imposition of tension on the flexible conduit means, and other devices carried by said body and actuated by the pressure of released gas effective to impose the pressure of the released gas on the fluid in the trailer braking system with resultant energization of the trailer brakes; said flexible member being rupturable in the event of breakaway separation of the trailer from the towing vehicle and being of sufficient tensile strenth so that prior to rupture, the tension thereon will actuate said gas releasing means with said disconnection of the fluid conduit means connecting the vehicles and simultaneous application of the trailer brakes.

18. In a hydraulic, vehicle braking system, a chamber containing fluid subjected to pressure incident to brake actuation, a fixed end wall portion of said chamber being disposed above other fluid containing portions of the system, a passageway through said end wall portion connecting said chamber with atmosphere, a valve seat at the end of said passageway communicating with said chamber, a spring biased valve element engaging said seat and normally preventing fluid to flow from said chamber through said passageway, a piston in said chamber, and means for moving said piston toward said end wall in the exertion of braking pressure on the fluid in said chamber by said piston and manually operable means for momentarily dislodging said valve from said seat with resultant escape through said passageway of any air collected in said portion of said chamber; the seating of said valve by said spring bias acting automatically to restore the integrity of the braking system.

19. In a hydraulic, braking system for trailers including connections for normal operation of the trailer brakes as a part of the braking system of the towing vehicle and devices for emergency actuation of the trailer brakes in event of unintended separation of the vehicles, the combination of a body member having a chamber containing fluid subjected to pressure incident to operation of the trailer brakes, a fixed end wall portion of said chamber being disposed above other fluid containing portions of the trailer brake system, a passageway through said end wall portion connecting said chamber with atmosphere, a valve seat at the end of said passageway communicating with said chamber, a spring biased valve engaging said seat and normally preventing fluid flow from said chamber through said passageway, a piston in said chamber, and means for moving said piston toward said end wall in the exertion of braking pressure on the fluid in said chamber by said piston and manually operable means for momentarily dislodging said valve from said seat with resultant escape through said passageway of any air collected in said portion of said chamber; the seating of said value by said spring bias acting automatically to restore the integrity of the braking system.

References Cited in the file of this patent

UNITED STATES PATENTS

| | | |
|---|---|---|
| 1,425,358 | Baer | Aug. 8, 1922 |
| 1,874,918 | Davis | Aug. 30, 1932 |
| 2,046,228 | Wiedmann et al. | June 30, 1936 |
| 2,229,499 | Fisette | Jan. 21, 1941 |
| 2,256,516 | Carlin | Sept. 23, 1941 |
| 2,362,324 | Stromberg | Nov. 7, 1944 |
| 2,534,509 | Franck | Dec. 19, 1950 |
| 2,674,852 | Olman | Apr. 13, 1954 |
| 2,814,363 | Phillips | Nov. 26, 1957 |
| 2,921,802 | Canner | Jan. 19, 1960 |
| 2,924,423 | Wieser et al. | Feb. 9, 1960 |
| 2,966,965 | Stair | Jan. 3, 1961 |

FOREIGN PATENTS

| | | |
|---|---|---|
| 459,389 | Italy | Sept. 5, 1950 |
| 191,550 | Netherlands | Dec. 15, 1956 |
| 142,423 | Sweden | Oct. 6, 1953 |